United States Patent

McGarrah

[11] Patent Number: 6,073,801
[45] Date of Patent: Jun. 13, 2000

[54] DISPENSING DEVICE FOR VENDING APPARATUS

[75] Inventor: Robert G. McGarrah, Brookfield, Conn.

[73] Assignee: PepsiCo, Inc., Purchase, N.Y.

[21] Appl. No.: 09/253,784

[22] Filed: Feb. 22, 1999

[51] Int. Cl.[7] .................................................. B65G 59/00
[52] U.S. Cl. .......................... 221/298; 221/299; 221/300
[58] Field of Search .................................. 221/278, 279, 221/298, 299, 300

[56] References Cited

U.S. PATENT DOCUMENTS

| | | | |
|---|---|---|---|
| 1,212,674 | 1/1917 | Perrin | 194/48 |
| 2,376,682 | 5/1945 | Gerlich | 312/48 |
| 2,832,281 | 4/1958 | Wilcox | 101/4 |
| 3,036,735 | 5/1962 | Peterson | 221/289 |
| 3,169,662 | 2/1965 | Goran | 221/236 |
| 3,837,528 | 9/1974 | Rakucewicz | 221/298 X |
| 3,991,907 | 11/1976 | Kull | 221/84 |
| 4,119,243 | 10/1978 | Marecek et al. | 221/298 |
| 4,194,648 | 3/1980 | Stanton | 221/299 |
| 5,111,965 | 5/1992 | Allen et al. | 221/281 |
| 5,224,659 | 7/1993 | Gabardi | 221/298 X |
| 5,335,810 | 8/1994 | Holloway | 221/10 |
| 5,335,818 | 8/1994 | Maldanis et al. | 221/298 X |

Primary Examiner—Christopher P. Ellis
Assistant Examiner—Gene O. Crawford
Attorney, Agent, or Firm—Fitzpatrick, Cella, Harper & Scinto

[57] ABSTRACT

The present invention is directed to a dispensing device for a vending apparatus which includes a shaft, having articles for dispensing, a pump, a first tube provided substantially near the bottom end of the shaft and connected to the pump for repeated inflation and deflation, and a second tube provided at a distance above the first tube and connected to the pump for repeated inflation and deflation. The distance defines a dispensing area containing an article for dispensing.

17 Claims, 8 Drawing Sheets

DISPENSING DEVICE FOR VENDING APPARATUS

FIELD OF THE INVENTION

The present invention relates to an article dispensing device for dispensing different articles, such as beverage containers, in succession to a desired dispensing area, and for holding back other such articles.

BACKGROUND OF THE INVENTION

Vending machines using prior art dispensing devices consist of a variety of designs in which mechanical members are moved to retain and dispense various types of articles. At the heart of these mechanical designs are structural members which operate as both a retaining mechanism, to retain the articles for dispensing within the vending apparatus, and a releasing mechanism, which release article(s) to a purchaser. Although these prior art devices presently dispense a variety of articles and have been in use for many years, they suffer from a number of problems.

One of the biggest problems facing vending machine owners is the cost involved with the frequent service calls required to have the vending machines, and in particular, the dispensing mechanisms within those machines, repaired and maintained, as well as the loss of sales for the articles contained in the vending machines themselves which are not dispensed due to malfunction of the mechanical mechanism.

This problem is mainly the result of the mechanical design of the prior art systems. Specifically, the prior art dispensing systems includes many mechanical parts that can jam and ultimately fail without warning. In an effort to prevent such breakdowns, frequent maintenance is required so that these parts can be properly adjusted, lubricated and/or replaced.

In addition to the repair costs and maintenance, there is also the problem of noise. Due to the design of the prior art dispensing devices, an appreciable amount of noise is generated during operation. Typically, such noise is generated by the interaction of the various moving parts, as well as the transportation of articles within the dispensing mechanism. Accordingly, this noise is particularly bothersome if the vending device is located in a library, movie theater, or other quiet environment.

Thus, there is a need to design a vending machine having a dispensing device that contains fewer parts, requires less repairs and maintenance and is quiet in operation.

SUMMARY AND OBJECTS OF THE INVENTION

In one aspect of the present invention, a dispensing device for a vending apparatus includes a shaft having articles for dispensing, a pump, a first tube provided substantially near the bottom end of the shaft and connected to the pump for repeated inflation and deflation, and a second tube provided at a distance above the first tube and connected to the pump for repeated inflation and deflation. The distance between the two tubes defines a dispensing area containing an article for dispensing.

In another aspect of the current invention, a method for dispensing an article from a dispensing device in a vending apparatus is provided, where the dispensing device including a shaft having articles for dispensing, a pump, a first tube provided substantially near the bottom end of the shaft and connected to the pump for repeated inflation and deflation, and a second tube provided at a distance above the first tube and connected to the pump for repeated inflation and deflation. The distance between the two tubes defines a dispensing area containing an article for dispensing. The method comprises the steps of deflating the first tube upon a request for dispensing an article retained in the first dispensing area dispensing the article from said first dispensing area out the bottom of said shaft, inflating the first tube, deflating the second tube, advancing another article from the shaft into the first dispensing area, and inflating the second tube.

In yet another aspect of the present invention, a dispensing device for a vending apparatus includes a shaft having articles for dispensing, a pump, a first tube provided substantially near the bottom end of the shaft and connected to the pump for repeated inflation and deflation, and a second tube provided on the same side of the shaft as the first tube at a first distance above the first tube. The second tube is connected to the pump for repeated inflation and deflation and the first distance defines a first dispensing area containing an article for dispensing. A first support is also provided within the first dispensing area on a side of the shaft opposite the tubes. The dispensing device also includes a third tube provided on the same side of the shaft as the first and second tubes at a second distance above the second tube. The third tube is connected to the pump for repeated inflation and deflation and the second distance defines a second dispensing area containing an article for dispensing. A second support is also provided within the second dispensing area on a side of the shaft opposite the tubes.

In yet another aspect of the present invention, a method for dispensing an article from a dispensing device in a vending apparatus is provided. The dispensing device including a shaft having articles for dispensing, a pump, a first tube provided substantially near the bottom end of the shaft and connected to the pump for repeated inflation and deflation, and a second tube provided on the same side of the shaft as the first tube at a first distance above the first tube. The second tube is connected to the pump for repeated inflation and deflation and the first distance defines a first dispensing area containing an article for dispensing. A first support is provided within the first dispensing area on a side of the shaft opposite the tubes. The dispensing device also includes a third tube provided on the same side of the shaft as the first and the second tubes at a second distance above the second tube. The third tube is connected to the pump for repeated inflation and deflation and the second distance defines a second dispensing area containing an article for dispensing. A second support is provided within the second dispensing area on a side of the shaft opposite the tubes. The method includes the steps of, deflating the first tube upon a request for dispensing an article retained in the first dispensing area, dispensing an article out of the first dispensing area, inflating the first tube, deflating the second tube and the third tube, advancing articles from the shaft into the first dispensing area and the second dispensing area, and inflating the second tube and the third tube.

Therefore, it is an object of the present invention to provide a dispensing device for use in a vending apparatus which avoids the above-mentioned disadvantages of the prior art.

Another object of the present invention is to provide a dispensing device for use in a vending apparatus which can smoothly transport articles to be dispensed from a storage area to a delivery area.

Another object of the present invention is to provide a dispensing device for a vending apparatus which is simple in operation.

An additional object of the present invention is to provide a dispensing device for a vending apparatus which is durable in construction.

A further object of the present invention is to provide a dispensing device for a vending apparatus which is quiet in operation.

A still further object of the present invention is to provide a dispensing device for a vending machine which has less moveable parts so as to minimize mechanical failures.

Yet a further object of the present invention is to provide a dispensing device for a vending apparatus requiring little maintenance and less frequent repair.

These and other objects and aspects, and many of the attendant advantages of this invention, will be readily appreciated and better understood by reference to the following detailed description when considered in connection with the accompanying drawings summarized below.

DETAILED DESCRIPTION OF PREFERRED EMBODIMENTS

FIGS. 1 and 3–6 illustrate a vending machine 1, having a dispensing device 2, currency receiving portions 9a and 9b, dispensing areas 3a and 3b, and refrigeration portion 7 (for keeping beverages or food products cold).

Figure 3:
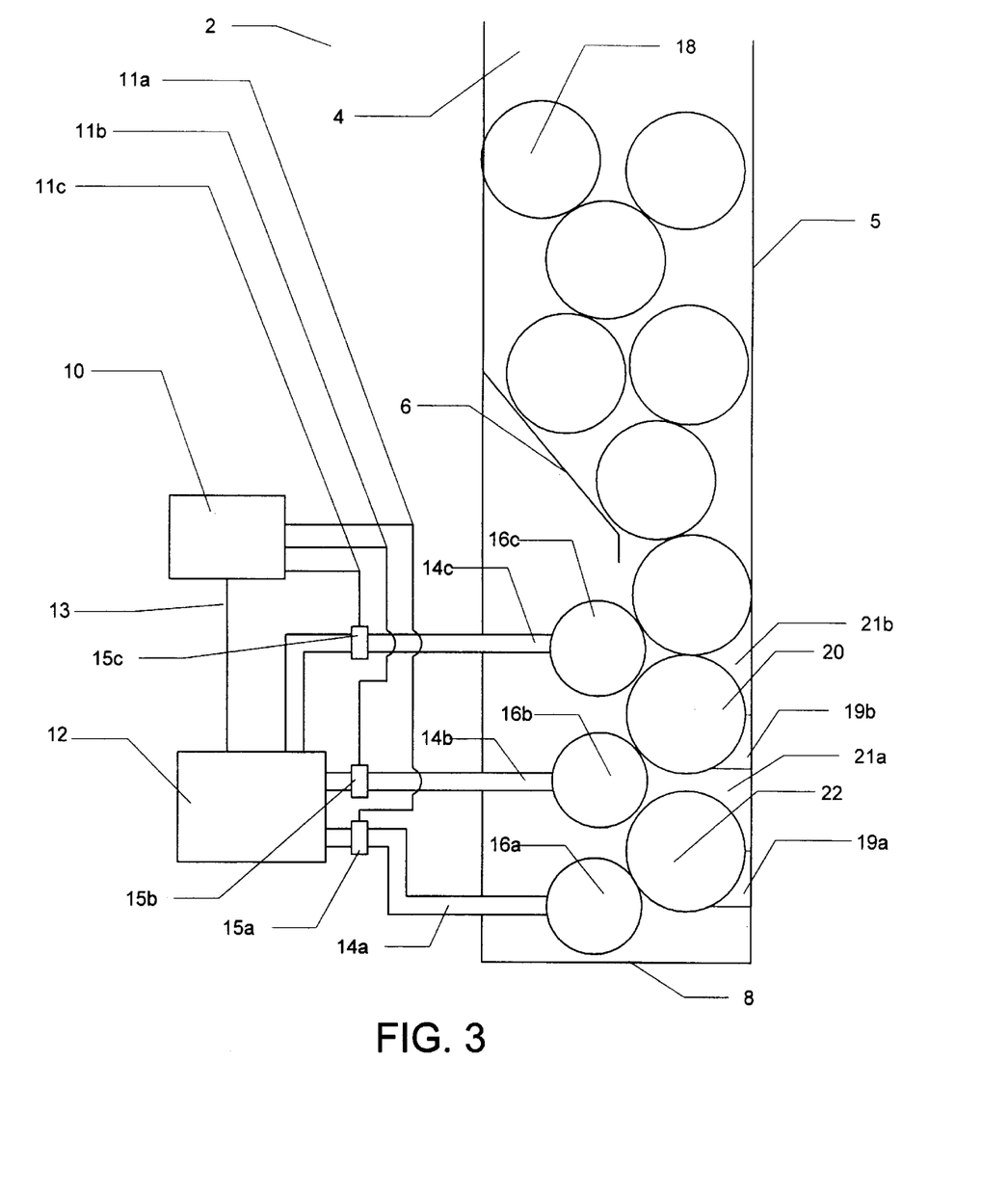
FIG. 3 is schematic a side view of a dispensing device according to a first embodiment for the present invention.

The dispensing device 2 includes spaced vertical walls defining an open shaft 4. The articles to be dispensed, for example beverage cans 18, are dispensed in the shaft 4 and may be multiple rows of articles as shown. One vertical wall is provided with an inwardly extending inclined portion 6, which directs the articles 18 into a single row of articles to be dispensed. The upper area 4a (FIG. 5) of the shaft 4 may be wider to provide storage for a greater volume of the articles. In order to dispense and vend different sized articles using the same components, one vertical wall 5 of the shaft 4 may be adjustable to vary the width of the shaft to the approximate width of the particular article for vending.

The shaft 4 and upper area 4a can be made from any stable structural material including wood, metal, or plastic to provide adequate support for the articles to be dispensed. In order to insure smooth transport of various articles, the walls of the storage area are preferably made from a material or coated with a material having a low coefficient of friction.

At the lower portion of the shaft 4 is a first dispensing area 21a, which stores an article 22 in a ready position to be dispensed first. The first dispensing area 21 is defined by the space between a first inflatable dispensing tube 16a, which retains the next article 22 to be dispensed, and a second inflatable dispensing tube 16b which retains article 20 in a second dispensing area 21b. A third tube 16c retains the remainder of the articles stored in the shaft 4.

Alternatively, the second tube 16b and third tube 16c may be used to retain both the article stored in the second dispensing area and the remainder of the articles stored in the shaft.

Tubes 16a, 16b and 16c are manufactured from a durable rubber-type compound which can be of natural or synthetic variety. In order to inflate the tubes, they are connected to a pump 12, via pipes 14a–14c, respectively. The pipes are manufactured from a flexible piping material to allow the pipes to stretch and contract in accordance with the position of wall 5. Such piping is well known in the art.

Article supports 19a and 19b maybe positioned on wall 5 adjacent the first dispensing area 21a and the second dispensing area 21b, respectively, to aid in supporting the weight of the articles stored in the dispensing areas.

The pump provides a positive-pressure source to inflate the tubes with a gas or liquid (preferably gas), and may also provide a negative-pressure source to deflate the tubes for quick dispensing of articles for vending. Inflating and deflating the tubes is accomplished in a quick, quiet and efficient manner in the present invention, so as to quickly and quietly dispense a pre-determined number of articles (usually a single article) and refill the dispensing areas with a next article without incident, delay or excessive noise.

The pump may consist of an ordinary air compressor, or may be substituted with a charged air device, for all tubes, or one for each tube. Valves 15a–15c may also be used to allow pressurized gas in and/or out of each tube and may be opened independently or together to inflate or deflate a tube or tubes. In the present invention, valves 15a–15c are controlled by the control device 10 via control lines 11a–11c, respectively. It will be appreciated that although valves are illustrated in the present invention, they are not necessary. Specifically, inflation and deflation of the tubes may be accomplished by connecting each tube directly to a single-stroke, piston/cylinder pump, which allows almost instant inflation with a positive stroke, and instant deflation with a negative stroke of the piston. The single-stoke pump, however, may also be used in combination with valves.

Control unit 10 controls the process for moving an article from the storage area and the dispensing areas 21b and 21a and out through the bottom of the shaft 8, depending upon the following factors: inflation condition of the tubes, articles contained in the shaft and storage area, and upon the request for a item from the vending apparatus.

A process for dispensing articles from the present invention is accomplished by deflating the first tube 16a upon a request by a consumer for dispensing an article retained in the first dispensing area 21a. When tube 16a is deflated, the article 22 in the first dispensing area 21a falls out the bottom 8 of shaft 4. Tube 16b remains inflated so that the next article 20 positioned in second dispensing area 21b is not dispensed. After the article 22 has been dispensed, tube 16a is inflated and tube 16b is deflated so that article 20 moves from second dispensing area 21b down the shaft to first dispensing area 21a to be ready for vending. Tube 16b is then inflated and tube 16c is deflated allowing another article from the upper portion of the shaft to drop into second dispensing area 21b. Tube 16c is then inflated to retain the remainder of the articles stored in the upper portion of the shaft above the second dispensing area 21b.

Alternatively, second tube 16b and third tube 16c can be inflated and deflated at the same time to move articles from the upper portion of the shaft 4 into both the second dispensing area and the first dispensing area.

The inflated tubes may support the entire weight of an article or articles, or may support only a portion thereof when used in conjunction with article support 19a and/or 19b, fixed to wall 5. In either case, an article cannot pass by the inflated tube. However, by deflating a tube, the width of the shaft adjacent the tube is changed to slightly larger than the width of an article. This allows the article to move past the tube and down the shaft.

Figure 6:
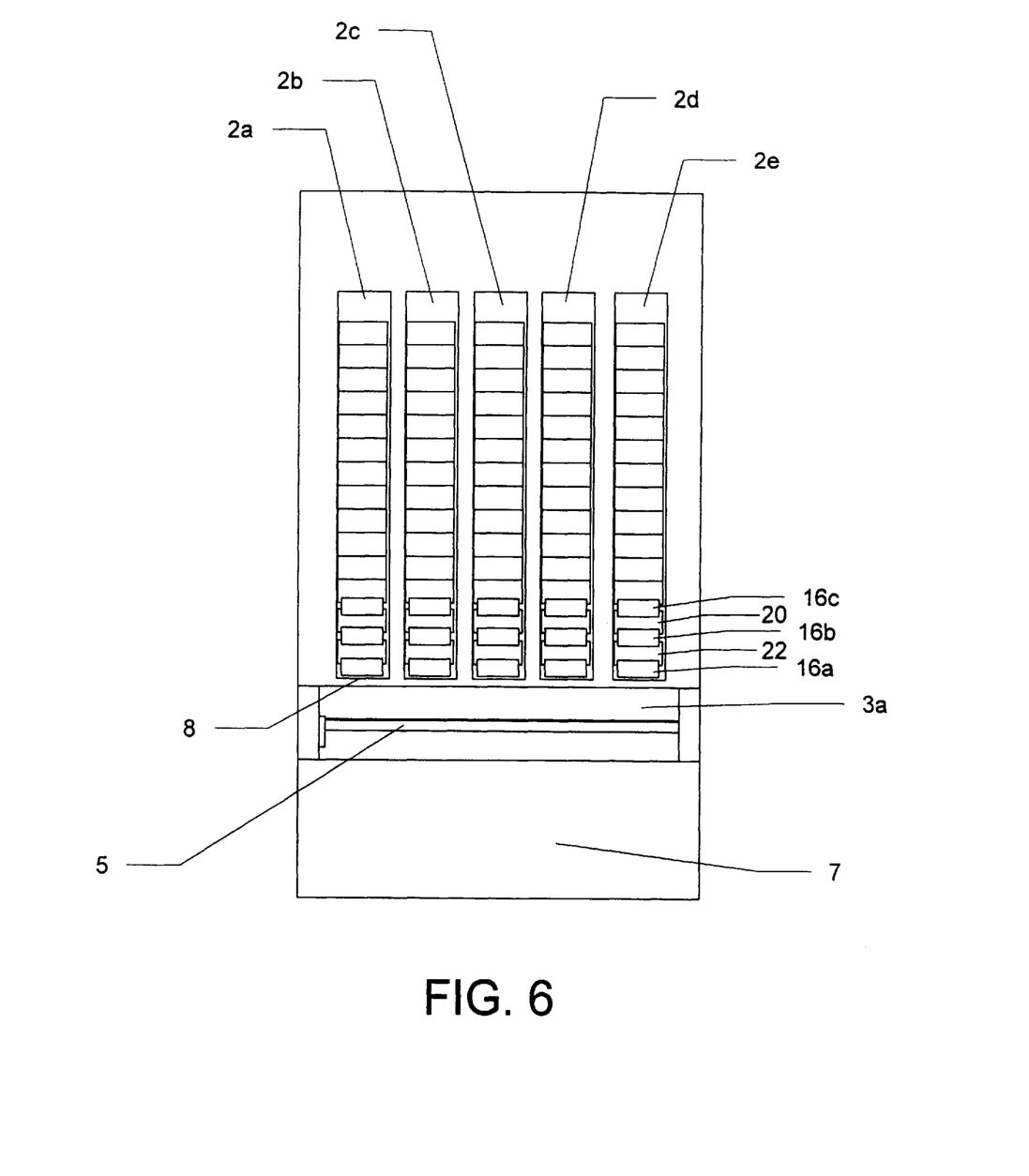
FIG. 6 is a front view of an outline of a vending machine having a plurality of dispensing devices according to the present invention.

In more detail, the process of dispensing an article from the dispensing device begins when a consumer requests one of the articles from the vending machine. Based upon the consumer's selection, a signal is sent to the appropriate dispensing device 2 (2a–2e; FIG. 6) containing the article desired by the consumer. Control unit 10 signals valve 15a via control line 11a to release pressure from tube 16a to deflate the tube. At that time, the article retained in the first dispensing area 21a is released out the bottom 8 of shaft 4, to be delivered to the consumer. Control unit 10 then signals the valve 15a to hold pressure within tube 16a and pipe 14a, at which time pump 12 is signaled via control line 13, to inflate the tube 16a.

Control unit 10 then signals valve 15b, via control line 11b, to release pressure from tube 16b, so that tube 16b deflates to allow the article stored in the second dispensing area 21b to pass to the first dispensing area 21a. Article 20 then passes to area 21a, at which time control unit 10 signals valve 15b to retain pressure and pump 12 to inflate tube 16b. When tube 16b is fully inflated, control unit 10 signals valve 15c to release pressure and deflate tube 16c, to allow an article from upper area 4a of shaft 4 to pass to the second dispensing area 21b. Valve 15c is then closed and pump 12 is activated via control line 13 to inflate tube 16c, so that the remainder of the articles in upper area 4a are retained.

As mentioned earlier, tubes 16b and 16c, along with valves 15b and 15c, respectively, may be operated concurrently, so that the first and second dispensing areas are filled with an article at the same time.

Alternative designs for the dispensing device 2 are illustrated in FIGS. 7–10. These designs use different arrangements of tubes to perform the same task as that of the preferred dispensing device illustrated in FIG. 2, and may be used with or without article support members (see FIG. 3, 19a and 19b).

Figure 2:
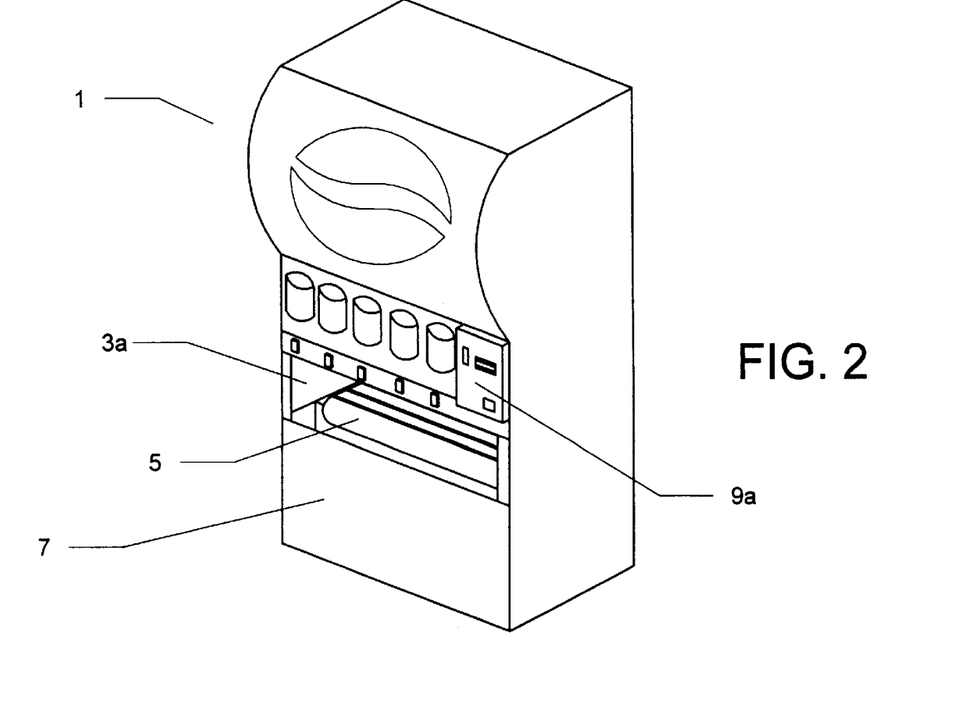
FIG. 2 is a perspective view of a vending machine with a single dispensing area for use with a dispensing device according to the present invention.
Figure 7:
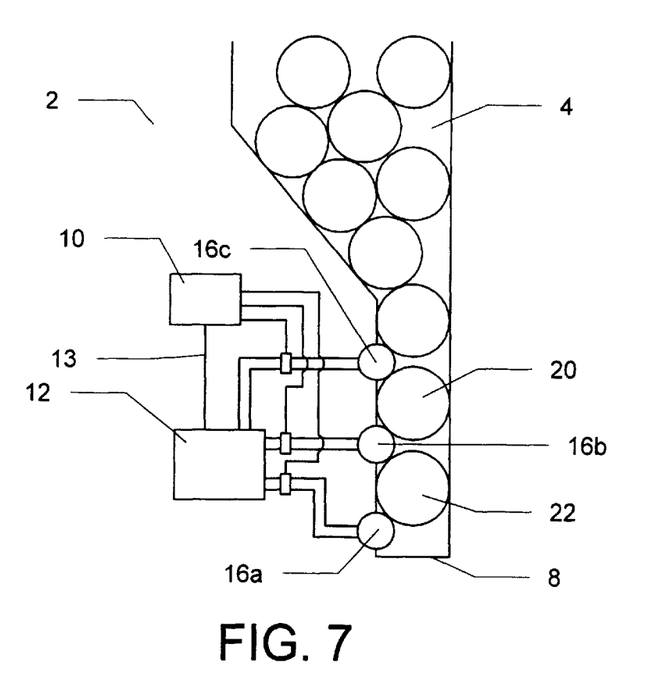
FIG. 7 is a schematic side view of a dispensing device according to another embodiment for the present invention.

The embodiment of the invention illustrated in FIG. 7 is identical to the dispensing device illustrated in FIG. 2, except for the support members 19a and 19b. Thus, the process for dispensing an article is the same. In this embodiment, tubes 16a, 16b and 16c bear the entire weight of the stored article.

Figure 8:
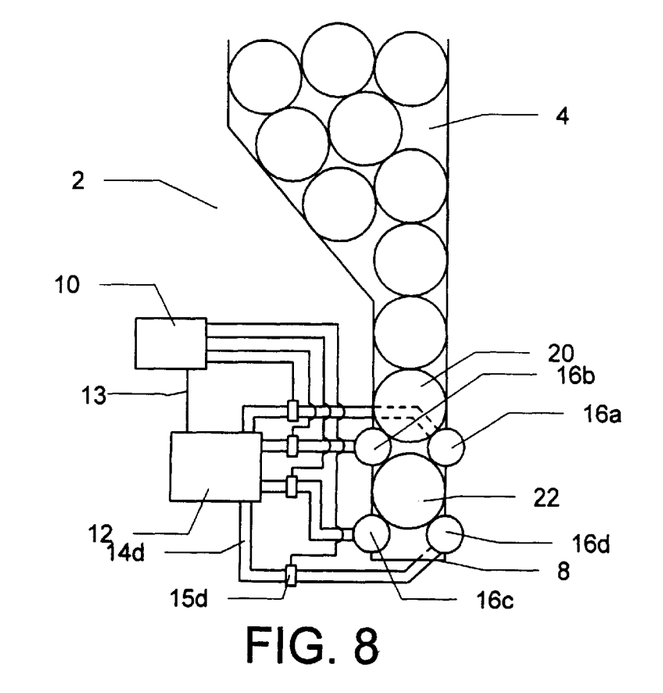
FIG. 8 is a schematic side view of a dispensing device according to another embodiment for the present invention.

FIG. 8 illustrates an embodiment of the invention using four tubes—tubes 16a and 16b for retaining the stored articles for dispensing, and tubes 16c and 16d retain the article stored in first dispensing area 21a. Of course, for tube 16d, additional pipe 14d, valve 15d and control line 11d are required. For dispensing an article for this embodiment, tubes 16c and 16d are deflated together, which dispenses the article 22 stored in first dispensing area 21a out from the bottom 8 of shaft 4. Tubes 16c and 16d are then inflated. To position another article in the first dispensing area, tubes 16a and 16b are deflated and the article 20 retained in second dispensing area 21b passes to the first dispensing area 21a. Tubes 16a and 16b are then re-inflated.

Figure 9:
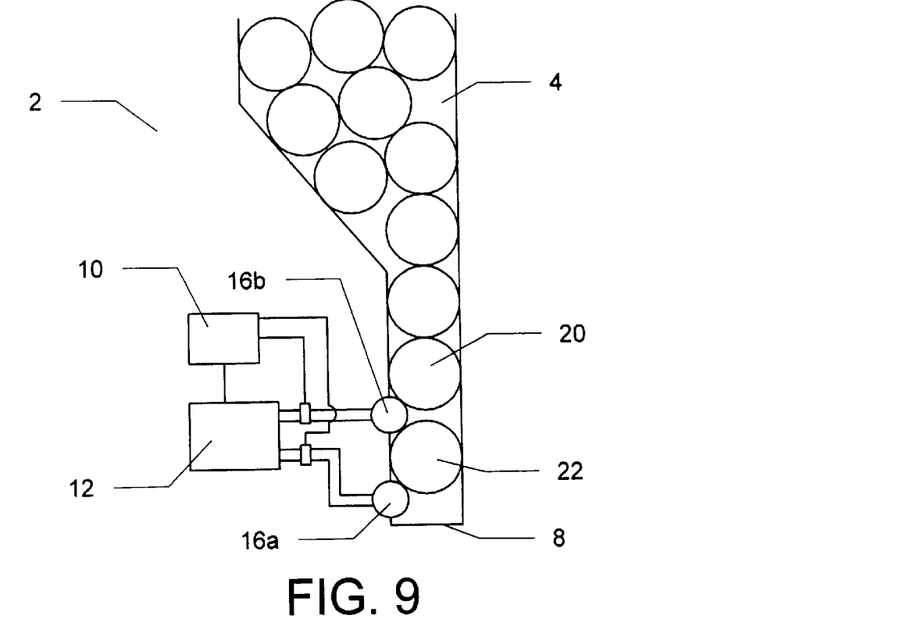
FIG. 9 is a schematic side view of a dispensing device according to another embodiment for the present invention.
Figure 10:
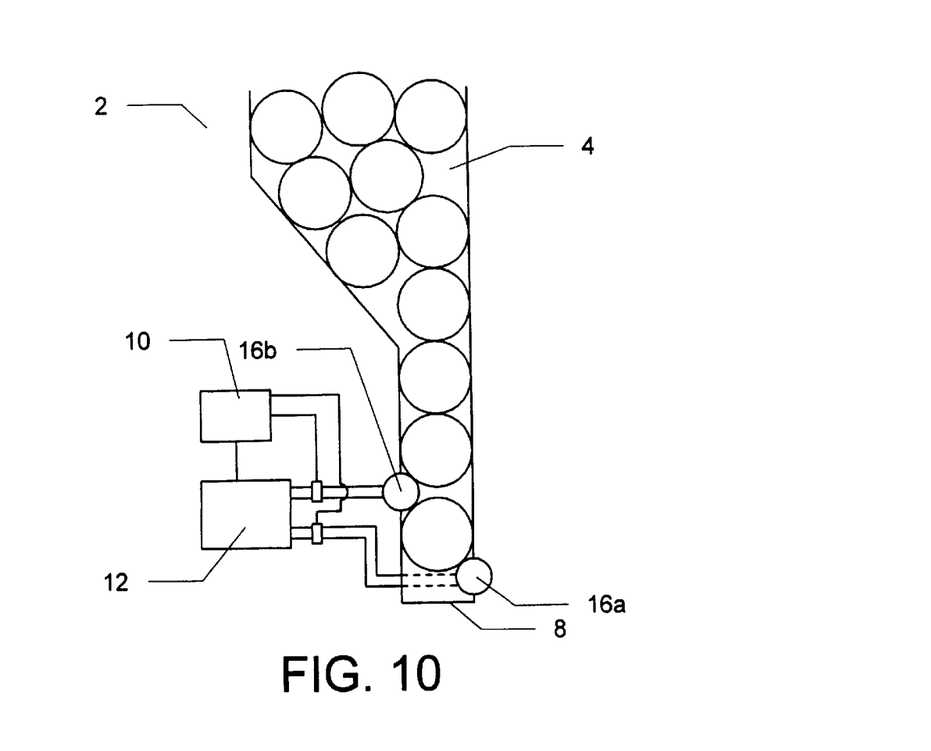
FIG. 10 is a schematic side view of a dispensing device according to another embodiment for the present invention.

FIGS. 9 and 10 illustrate embodiments for the present invention using only two tubes. The embodiment shown in FIG. 9 dispenses the article from the first dispensing area 21a by deflating tube 16b. Tube 16b is then inflated and tube 16a is deflated to pass article 20 from the second dispensing area 21b to the first dispensing area 21a. Tube 16a is then inflated to retain the remainder of stored articles.

The embodiment shown in FIG. 10 dispenses an article in the same manner as the embodiment shown in FIG. 9, except that tube 16b is positioned on the opposite wall of shaft 4 than tube 16a.

It will be appreciated that the tubes according to the present invention may also be constructed so that the tube encompasses the entire perimeter of the shaft. For example, the tube may be constructed as a ring-like, or oval-like member. Thus, for this type of tube construction, the article for dispensing is passed through the center of the tube when it is deflated.

Figure 1:
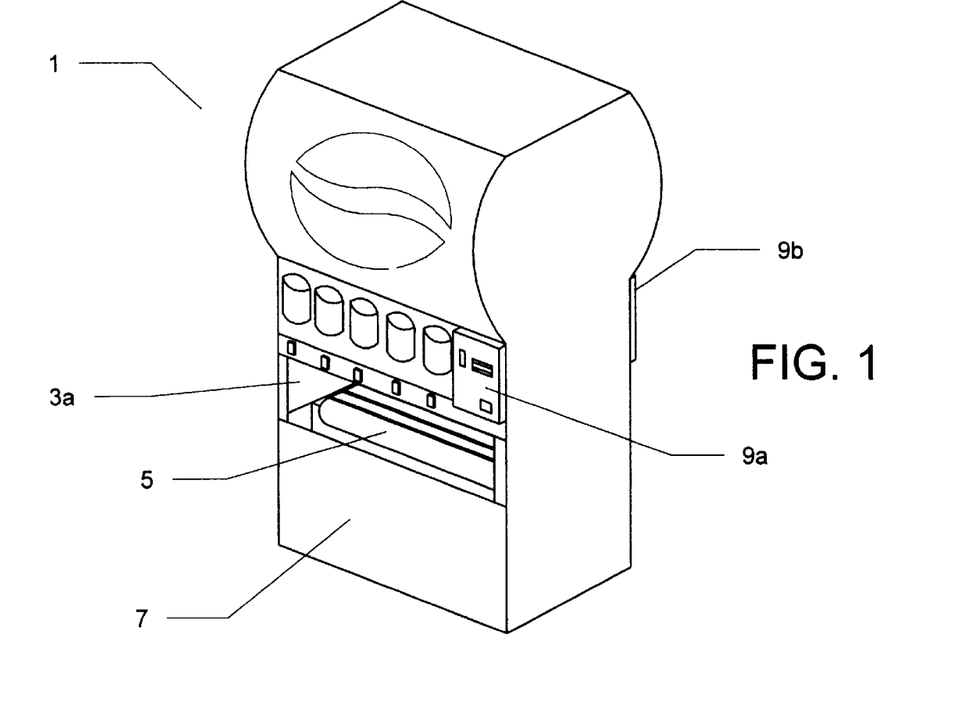
FIG. 1 is a perspective view of a vending machine with two dispensing areas for use with a dispensing device according to the present invention.
Figure 4:
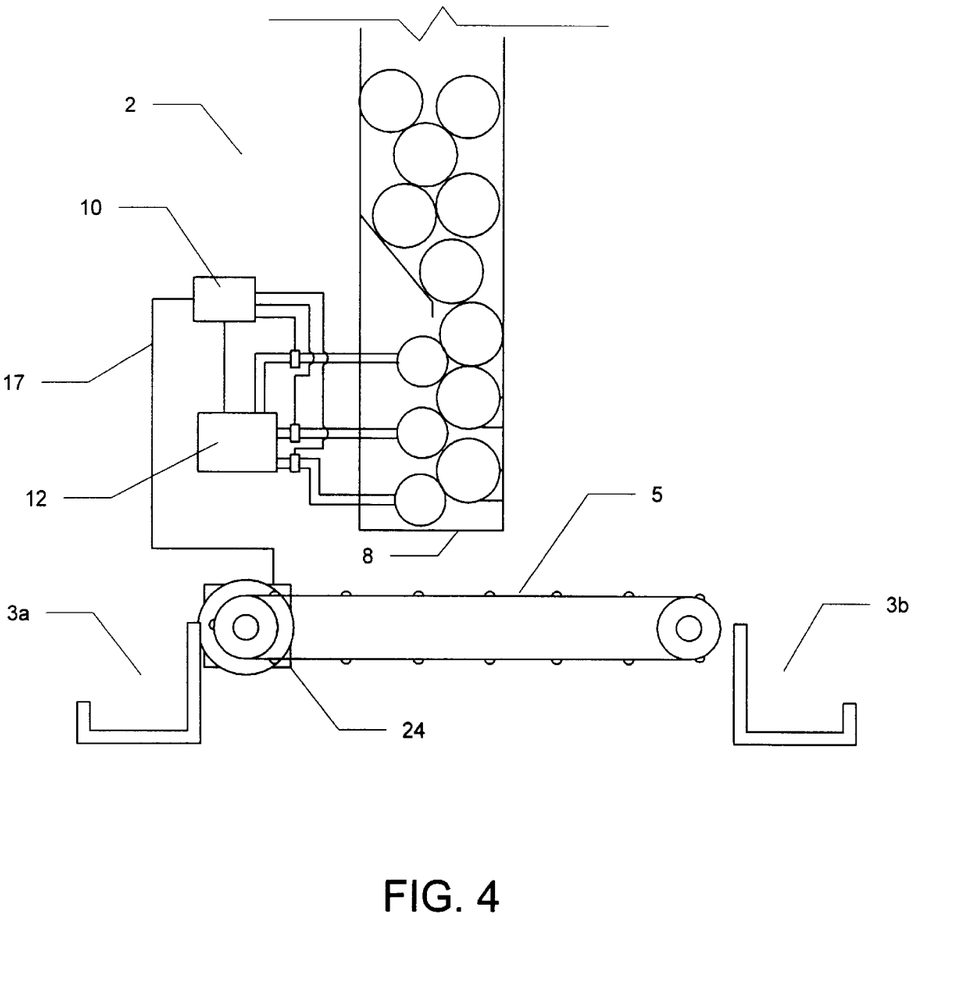
FIG. 4 is a schematic side view of the dispensing device as used with a transport mechanism for transporting a dispensed article to a dispensing area of a vending machine.
Figure 5:
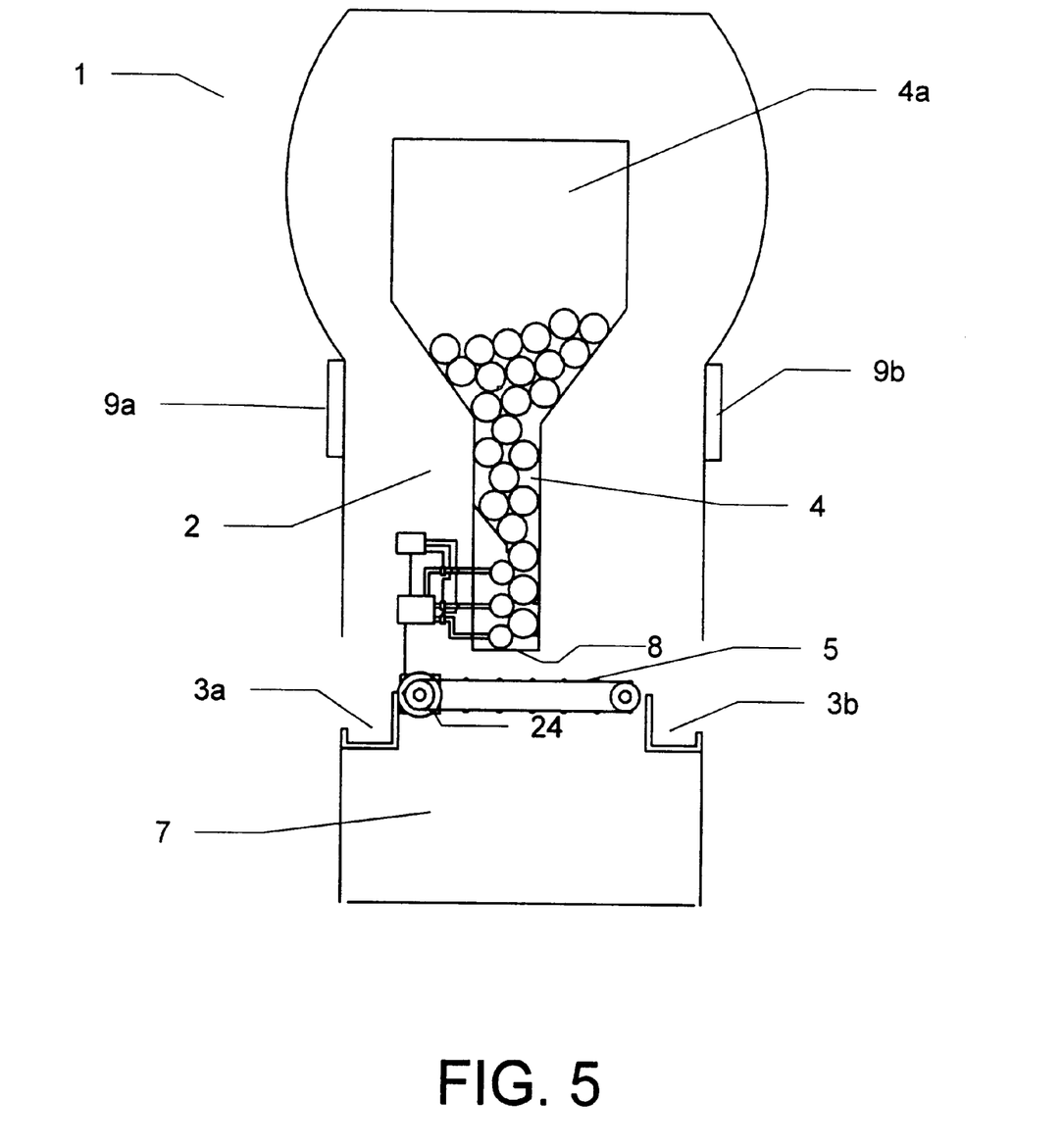
FIG. 5 is a schematic side view of a vending machine having the dispensing device and transport mechanism of FIG. 4.

To move the dispensed article to the dispensing area of the vending machine, a transport mechanism 5 is provided as illustrated in FIGS. 4 and 5. Specifically, an article dispensed from the dispensing device 2 falls onto transport mechanism 5, in this case a conveyor, and is transported to the dispensing area 3a or 3b, depending upon on the side of the vending machine where a consumer requested the article. For illustrative purposes, the present invention is shown with a vending machine having a single dispensing area 3a, as shown in FIG. 2, and with duel dispensing areas 3a and 3b as shown in FIG. 1, However, the invention may be used with a vending machine having a single dispensing area as shown in FIG. 2. A plurality of dispensing devices 2a–2e may be provided in a single vending machine, each containing a different article to dispense, as shown in FIG. 6.

The motion of the transport mechanism 5 for transporting a dispensed article to a consumer may be initiated through the use of a sensor, which detects when an article has been dropped thereon, or activated by a control unit 10 via control line 17. In either case, the article is transported to the correct dispensing area, 3a or 3b, at which time the conveyor stops.

Figure 11:
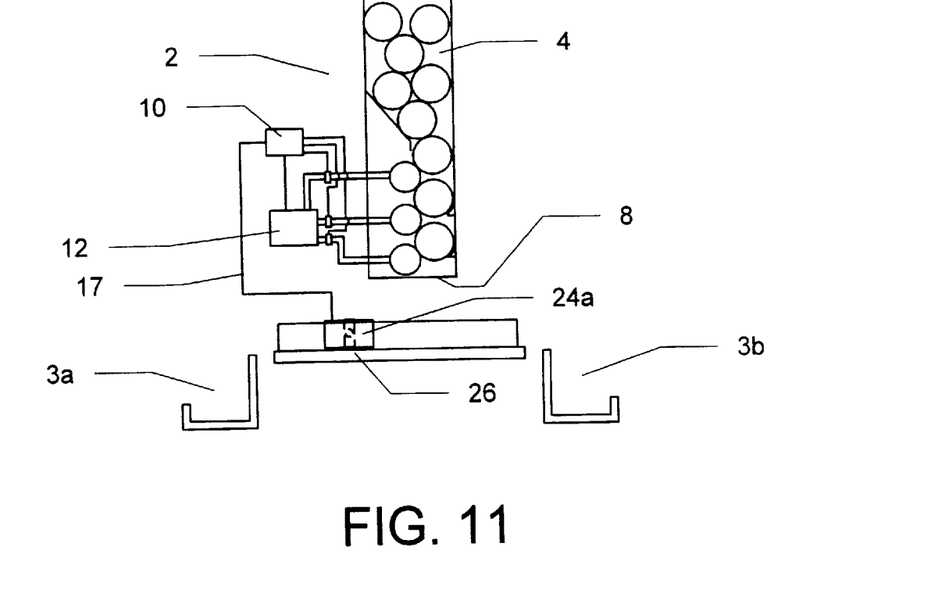
FIG. 11 is a schematic side view of a first alternative design for a transport mechanism for transporting a dispensed item to a dispensing area of a vending machine.
Figure 12:
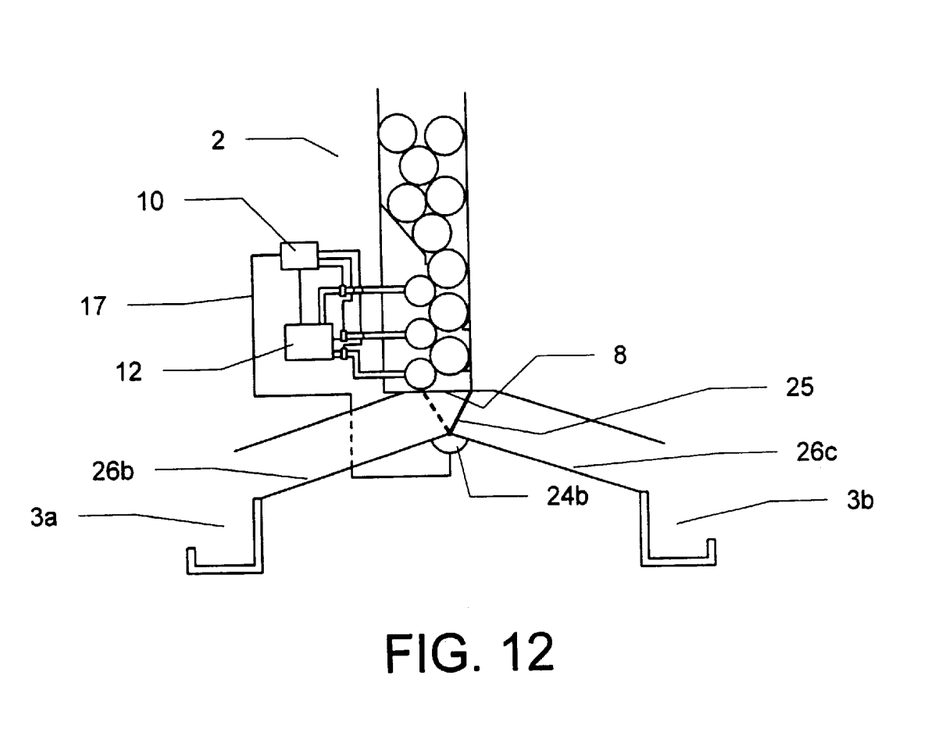
FIG. 12 is a schematic side view of a second alternative design for a transport mechanism for transporting a dispensed item to a dispensing area of a vending machine.

Alternative designs for the transport mechanism for transporting a dispensed article to the dispensing areas of a vending machine are illustrated in FIGS. 11 and 12. FIG. 11 illustrates a linear motor 24a, which is activated by a sensor or control line 17, where the armature of the linear motor is connected to a sweeper arm which pushes a dispensed article over a platform 26a to the correct dispensing area. FIG. 12 illustrates inclined chutes 26b and 26c which deliver the dispensed article to the correct dispensing area based upon the position of a flapper 25. Flapper control mechanism 24b rotates flapper 25, based upon sensor output and/or a signal from control unit 10 via control line 17, to dispense the article to the side of the vending machine where the consumer is waiting to receive the article.

While variations of the present invention for a dispensing device for vending apparatus are described in detail herein, it should be apparent that the disclosure and teachings of the present invention will suggest many other alternative designs to those skilled in the art. Accordingly, the present invention is not limited to the foregoing embodiment but is subject to various modifications within the scope and spirit of the claims.

What is claimed is:

1. A dispensing device for a vending apparatus comprising:
    a shaft housing articles for dispensing;
    a pump;
    a first tube provided substantially near the lower portion of said shaft and connected to said pump for selected repeated inflation and deflation; and
    a second tube provided at a distance above said first tube and connected to said pump for selected repeated inflation and deflation, said distance defining a dispensing area containing an article for dispensing.

2. A dispensing device for a vending apparatus according to claim 1, wherein said pump includes a first valve and a second valve positioned between said pump and said first tube and said second tube, respectively.

3. A dispensing device for a vending apparatus according to claim 1, wherein said shaft includes a support provided within said dispensing area and on a side of said shaft opposite said first tube.

4. A dispensing device for a vending apparatus according to claim 1, wherein said first tube and said second tube are positioned on the same side of said shaft.

5. A dispensing device for a vending apparatus according to claim 1, wherein said first tube and said second tube are positioned on opposite sides of said shaft.

6. A dispensing device for a vending apparatus according to claim 1, wherein the width of said shaft is adjustable.

7. A dispensing device for a vending apparatus according to claim 1, wherein an article positioned in said dispensing area is dispensed onto a delivery conveyor.

8. A dispensing device for a vending apparatus according to claim 1, wherein an article positioned in said dispensing area is dispensed onto a delivery surface having a sweeping member to transport said article to a dispensing area of said vending apparatus.

9. A dispensing device for a vending apparatus according to claim 1, wherein said first tube and said second tube are inflated by a gas.

10. A dispensing device for a vending apparatus according to claim 1, further comprising a third tube connected to said pump, said third tube positioned at a second distance above said second tube, wherein said second distance establishes a second dispensing area.

11. A dispensing device for a vending apparatus according to claim 10, wherein said shaft includes a first support provided within said dispensing area on a side of said shaft opposite said first tube.

12. A dispensing device for a vending apparatus according to claim 11, wherein said shaft also includes a second support provided within said second dispensing area on a side of said shaft opposite said second tube.

13. A method for dispensing an article from a dispensing device in a vending apparatus, said dispensing device including a shaft having articles for dispensing, a pump, a first tube provided substantially near the lower portion of said shaft and connected to said pump for selected repeated inflation and deflation, and a second tube provided at a distance above said first tube and connected to said pump for selected repeated inflation and deflation, said distance defining a dispensing area containing an article for dispensing, said method comprising the steps of:

deflating said first tube upon a request for dispensing an article retained in said first dispensing area;

dispensing the article from said dispensing area out said shaft;

inflating said first tube;

deflating said second tube;

advancing another article stored in said shaft into said first dispensing area; and inflating said second tube.

14. The method of dispensing an article of claim 13, further comprising the steps of:

dispensing said article from said dispensing area onto a conveyor belt; and transporting said article on said conveyor belt to a dispensing area of said vending machine.

15. The method of dispensing an article of claim 13, further comprising the steps of:

dispensing said article from said dispensing area onto a delivery surface; and sweeping said article with a sweeping member from said delivery surface to a dispensing area of said vending machine.

16. A dispensing device for a vending apparatus comprising:

a shaft having articles for dispensing;

a pump;

a first tube provided substantially near the lower end of said shaft and connected to said pump for selected repeated inflation and deflation;

a second tube provided on the same side of said shaft as said first tube at a first distance above said first tube, wherein said second tube is connected to said pump for selected repeated inflation and deflation and said first distance defines a first dispensing area containing an article for dispensing, and wherein a first support is provided within said first dispensing area on a side of said shaft opposite said tubes; and a third tube provided on the same side of said shaft as said first and said second tubes at a second distance above said second tube, wherein said third tube is connected to said pump for selected repeated inflation and deflation and said second distance defines a second dispensing area containing an article for dispensing into said first dispensing area, and wherein a second support is provided within said second dispensing area on a side of said shaft opposite said tubes.

17. A method for dispensing an article from a dispensing device in a vending apparatus, said dispensing device including a shaft having articles for dispensing, a pump, a first tube provided substantially near the lower end of said shaft and connected to said pump for selected repeated inflation and deflation, a second tube provided on the same side of said shaft as said first tube at a first distance above said first tube, wherein said second tube is connected to said pump for selected repeated inflation and deflation and said first distance defines a first dispensing area containing an article for dispensing, and wherein a first support is provided within said first dispensing area on a side of said shaft opposite said tubes, and a third tube provided on the same side of said shaft as said first and said second tubes at a second distance above said second tube, wherein said third tube is connected to said pump for selected repeated inflation and deflation and said second distance defines a second dispensing area containing an article for dispensing, and wherein a second support is provided within said second dispensing area on a side of said shaft opposite said tubes, said method comprising the steps of:

deflating said first tube upon a request for dispensing an article retained in said first dispensing area;

dispensing the article retained in said first dispensing area out said shaft;

inflating said first tube;

deflating said second tube and said third tube;

advancing another article from said shaft into said first dispensing area and said second dispensing area; and inflating said second tube and said third tube.

* * * * *